S. A. SHOAFF.
FEED WATER HEATERS AND FILTERS.

No. 179,966. Patented July 18, 1876.

WITNESSES:
Chas. Nida
John Goethals

INVENTOR:
S. A. Shoaff
BY
ATTORNEYS.

ered alternately from one side to some distance# UNITED STATES PATENT OFFICE.

SAMUEL A. SHOAFF, OF PENNVILLE, INDIANA.

IMPROVEMENT IN FEED-WATER HEATERS AND FILTERS.

Specification forming part of Letters Patent No. 179,966, dated July 18, 1876; application filed April 4, 1876.

*To all whom it may concern:*

Figure 1:
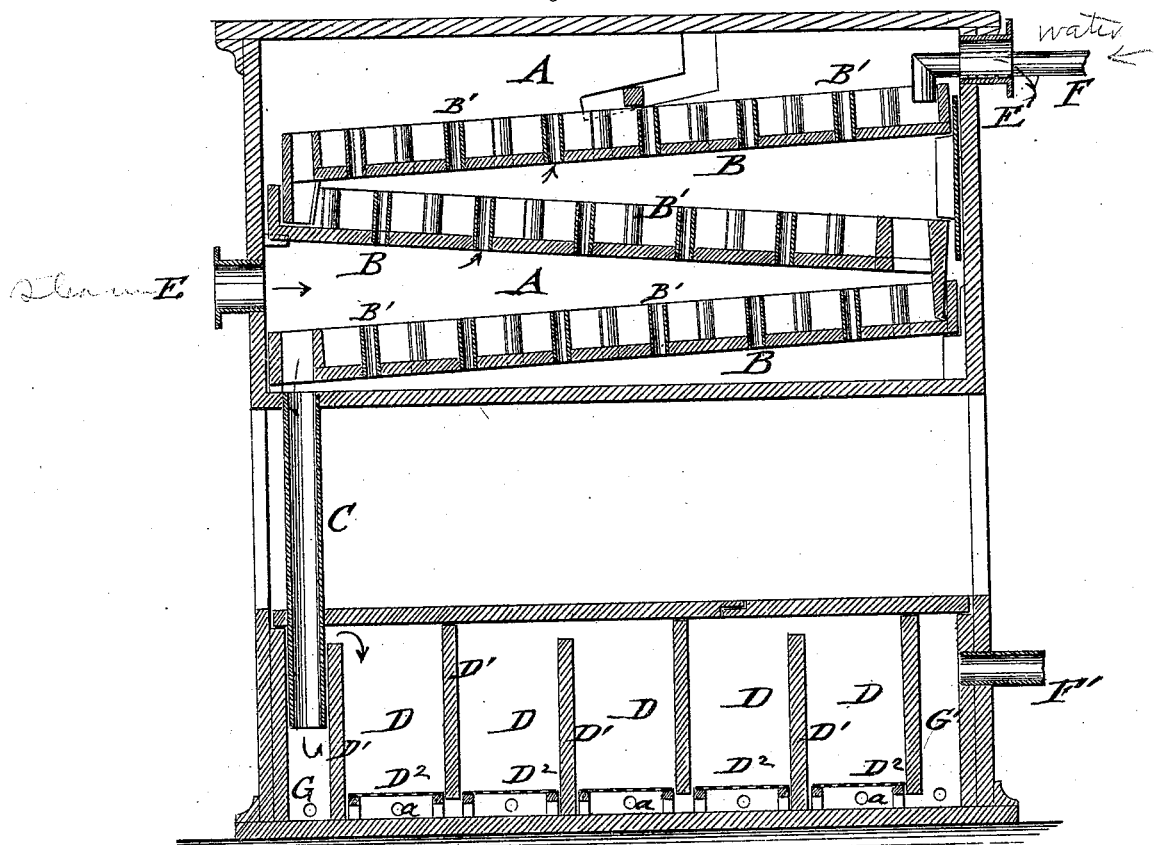
Figure 2:
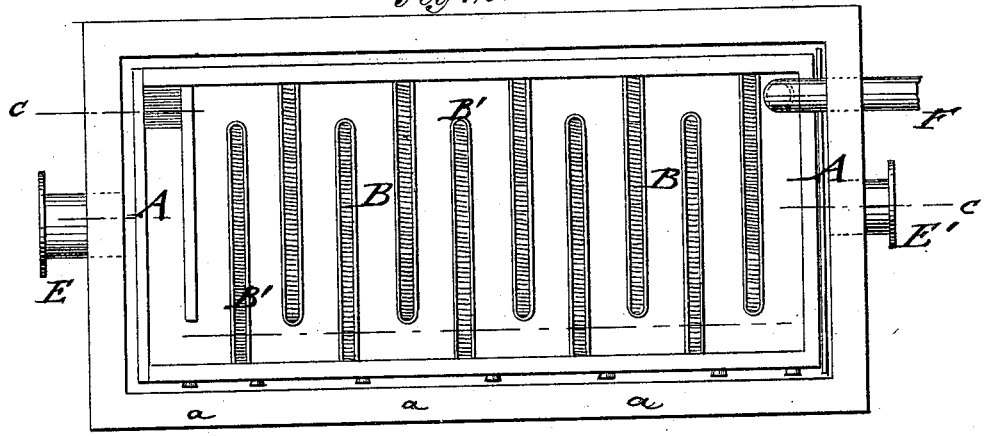

Be it known that I, SAMUEL A. SHOAFF, of Pennville, in the county of Jay and State of Indiana, have invented a new and Improved Feed-Water Heater and Filter, of which the following is a specification:

In the accompanying drawing, Figure 1 represents a vertical longitudinal section on line *c c*, Fig. 2, of my improved feed-water heater and filter; and Fig. 2 is a top view of the same with upper cover or lid detached.

Similar letters of reference indicate corresponding parts.

The invention relates to an improved feed-water heater and filter, in which the water is first thoroughly heated up by steam while passing in a tortuous course through the heater, so as to deposit the lime and then convey the water to the filtering-receptacle below, where the water is conducted through the compartments without being agitated by the steam.

The invention consists of a feed-water heater arranged above a filter, the heater being made of inclined sections, with lateral steam tubes or passages, that extend alternately from one side to some distance of the other side, to conduct the water around the same. The water is conveyed through a connecting-pipe to the filter, that is provided with entrance and exit chambers and filtering-compartments, separated by vertical partitions having alternate openings at the top or bottom.

In the drawing, A represents the feed-water heater, that is supported at some height above the filter, to leave an open space between the same. A number of inclined and rimmed sections or pans, B, are arranged in the heater A, and so connected and supported one above the other that the water may pass readily from one to the other. The water enters through a pipe, F, at the top part of the heater, while the steam for heating up the same enters through a pipe, E, at the opposite side and lower part of the heater, and passes up through openings and tubes B' of the sections or pans B, so as to surround the water from all sides and exercise a heating influence on the same.

The steam-tubes B' extend alternately from one side of the section or pan to some distance from the other side, so that the water is compelled to pass in a circuitous course around the same. The different sections are secured, by suitable heel bearings or shoes and top keys, securely in the heater, and furnish to the water an increased amount of contact-surface with the steam, so as to produce a superior capacity, and, by the ready detaching of the pans, a convenient arrangement for cleaning the heater. The steam leaves the heater through the exit-pipe E' at the upper side, opposite the entrance-pipe, after having circulated through and around the pans, and thoroughly heated up the water in its passage around the steam-tubes. The heated water is conducted from the lower pan B through a vertical connecting-tube, C, into the filtering-receptacle D. The tube D extends far enough down into the entrance compartment G of the filter that the water-level is always above the same, for the purpose of preventing the steam from exerting any more than a trifling force upon the water, so as to prevent the dashing of the water over the first division at each pulsation of the steam from the engine. The effect of the pulsations of the steam and the constant agitation of the water in the filter is thereby prevented, and, by the quiet passage of the water through the filtering-compartments, a more effective filtering obtained. The water passes from the entrance-compartment to the filtering-compartments that are formed by lateral partitions D¹, with alternate top and bottom openings or passages, for the passage of the water from one compartment to the next adjoining one. A suitable filtering material is supported on raised-bottom screens, D², and the filter readily cleaned by taking off the loose cover, the space between heater and filter giving convenience of access to the compartments. Bottom plugs *a* serve to draw off any sediments in the same. A small exit-chamber, G', with discharge-pipe F', is arranged symmetrically to the entrance-chamber at the opposite end of the filter, but without filtering material in the same.

The ready and quiet passage of the heated water through the filtering-compartment, together with the ready mode of cleaning the heater and filter and the simplicity of its con struction, furnishes a device of superior capacity for heating and filtering of feed-water for steam-engines.

Having thus described my invention, I claim as new and desire to secure by Letters Patent—

The combination of heater A, inclined pans B B', and tube C with the filtering-receptacle D, having compartments G and raised screens $D^2$, all constructed and arranged substantially as and for the purpose specified.

SAMUEL A. SHOAFF.

Witnesses:
  ISAAC T. SHARP,
  CHRISTIAN A. HORN.